United States Patent [19]

Deibel et al.

[11] 4,417,509

[45] Nov. 29, 1983

[54] TIERABLE AND NESTABLE RECEPTACLE

[75] Inventors: Christopher J. Deibel, Rocky River; Edward W. Massey, Parma, both of Ohio

[73] Assignee: Bliss & Laughlin Industries Incorporated, Oak Brook, Ill.

[21] Appl. No.: 290,439

[22] Filed: Aug. 6, 1981

[51] Int. Cl.³ .................... A22C 7/00; B30B 7/02; B65D 21/02
[52] U.S. Cl. .................... 99/467; 99/482; 100/194; 100/910; 206/505; 206/513
[58] Field of Search ............ 206/505, 513; 100/194, 100/910; 99/467, 482

[56] References Cited

U.S. PATENT DOCUMENTS

| | | | |
|---|---|---|---|
| 3,079,206 | 2/1963 | Glazen | 206/505 |
| 3,155,030 | 11/1964 | Curtis | 100/194 |
| 3,455,463 | 7/1969 | Rogus | 206/505 |
| 3,503,521 | 3/1970 | Rogus | 206/505 |

FOREIGN PATENT DOCUMENTS 920626 3/1963 United Kingdom ............ 206/505

Primary Examiner—George E. Lowrance
Attorney, Agent, or Firm—Baldwin, Egan, Walling & Fetzer

[57] ABSTRACT

A receptacle which may be tiered or stacked with other like receptacles and adapted to be nested when empty. Each receptacle in the tier or stack is intended to hold food products that are to be placed in a smoke house for cooking with the weight of each receptacle being supported by the product in the next lower receptacle in the stack and thus serving as a press to compress the product in said lower receptacle until such time as the product shrinks through the cooking process to a predetermined height. When the product is reduced to this predetermined height, each receptacle seats upon and rests upon the next lower receptacle in the stack to prevent further transmission of the product load and thus stops the pressing action at the predetermined height. Each receptacle is of unique design whereby it may be used to accommodate two alternate heights of smoked food product.

6 Claims, 14 Drawing Figures

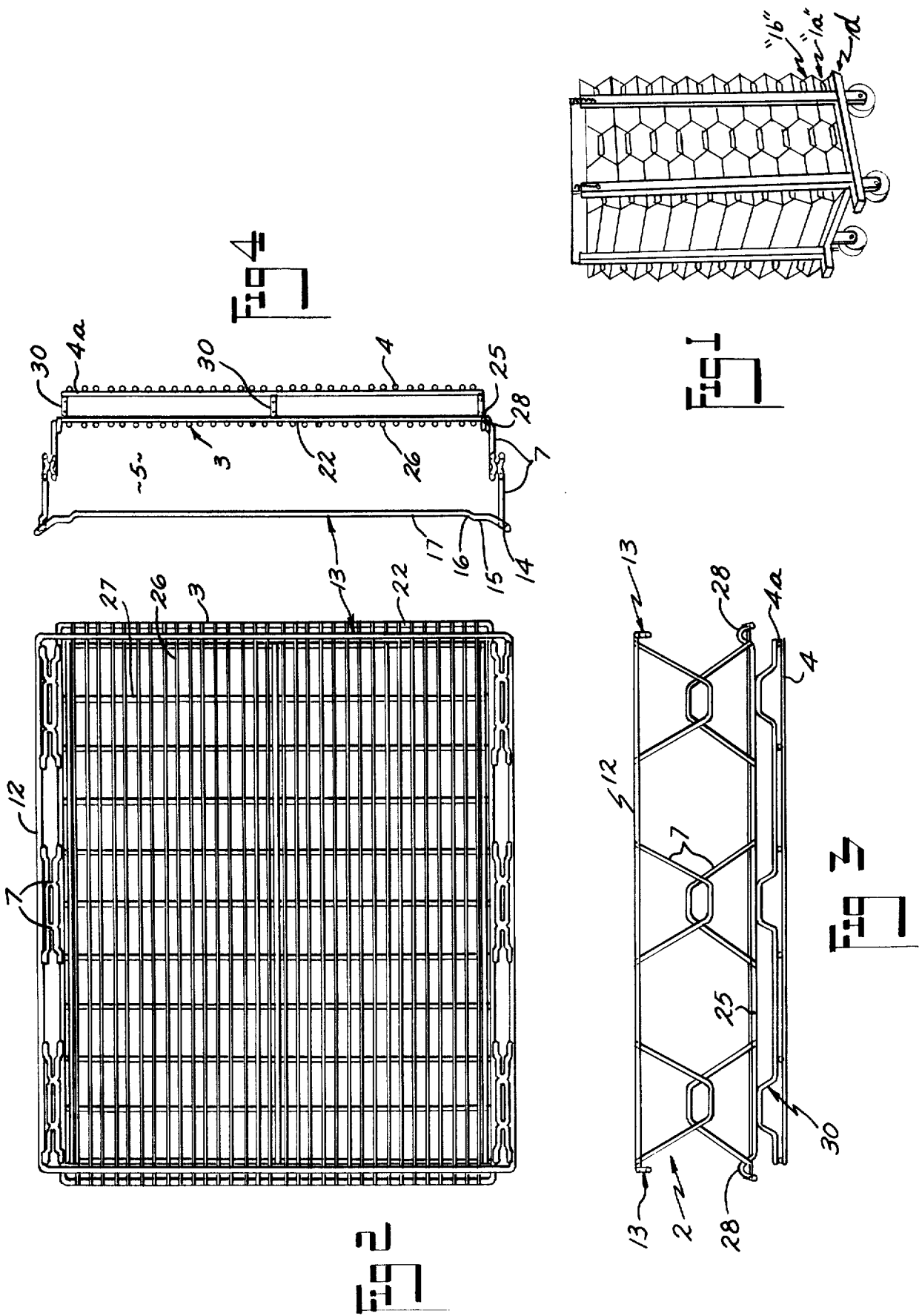

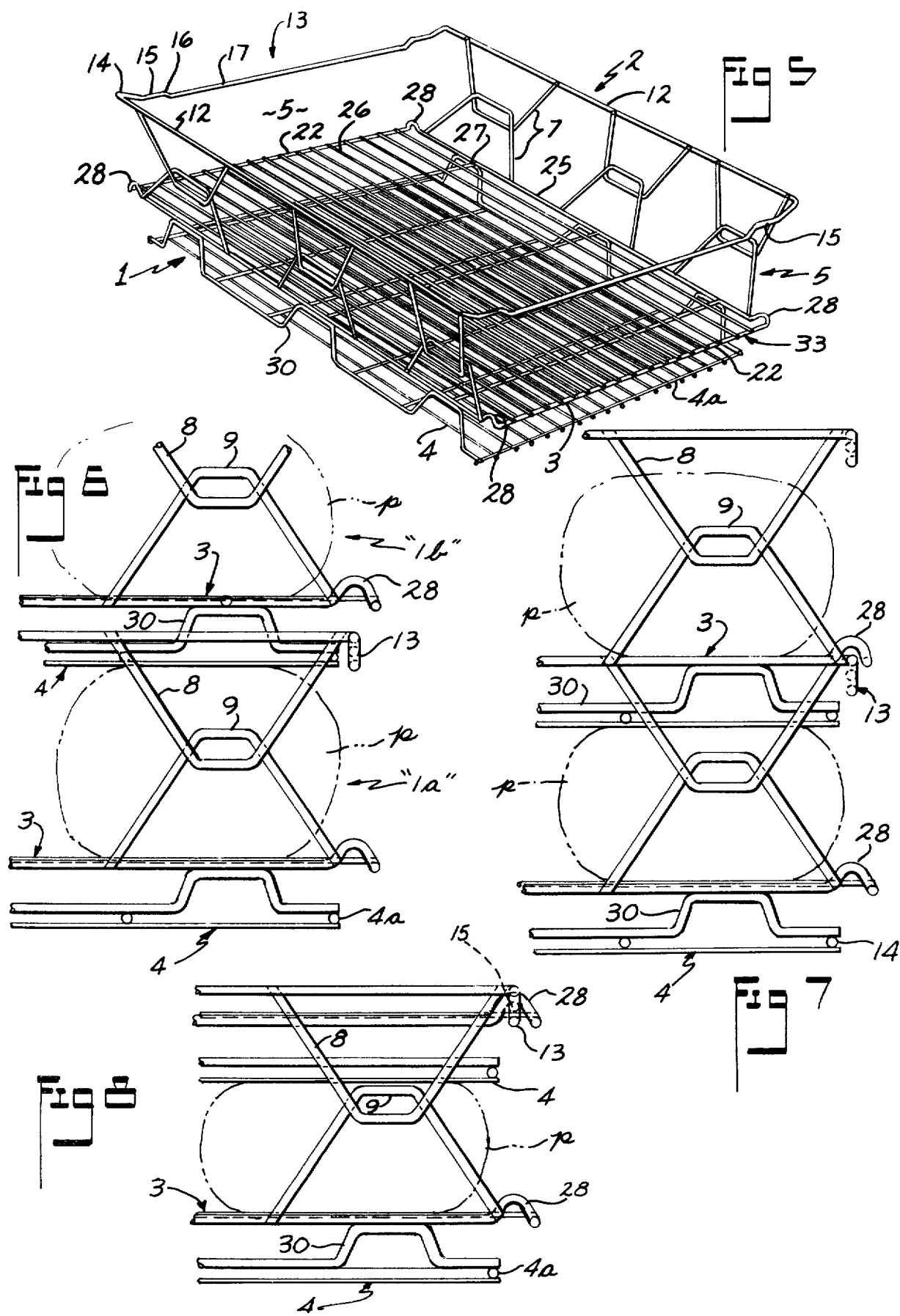

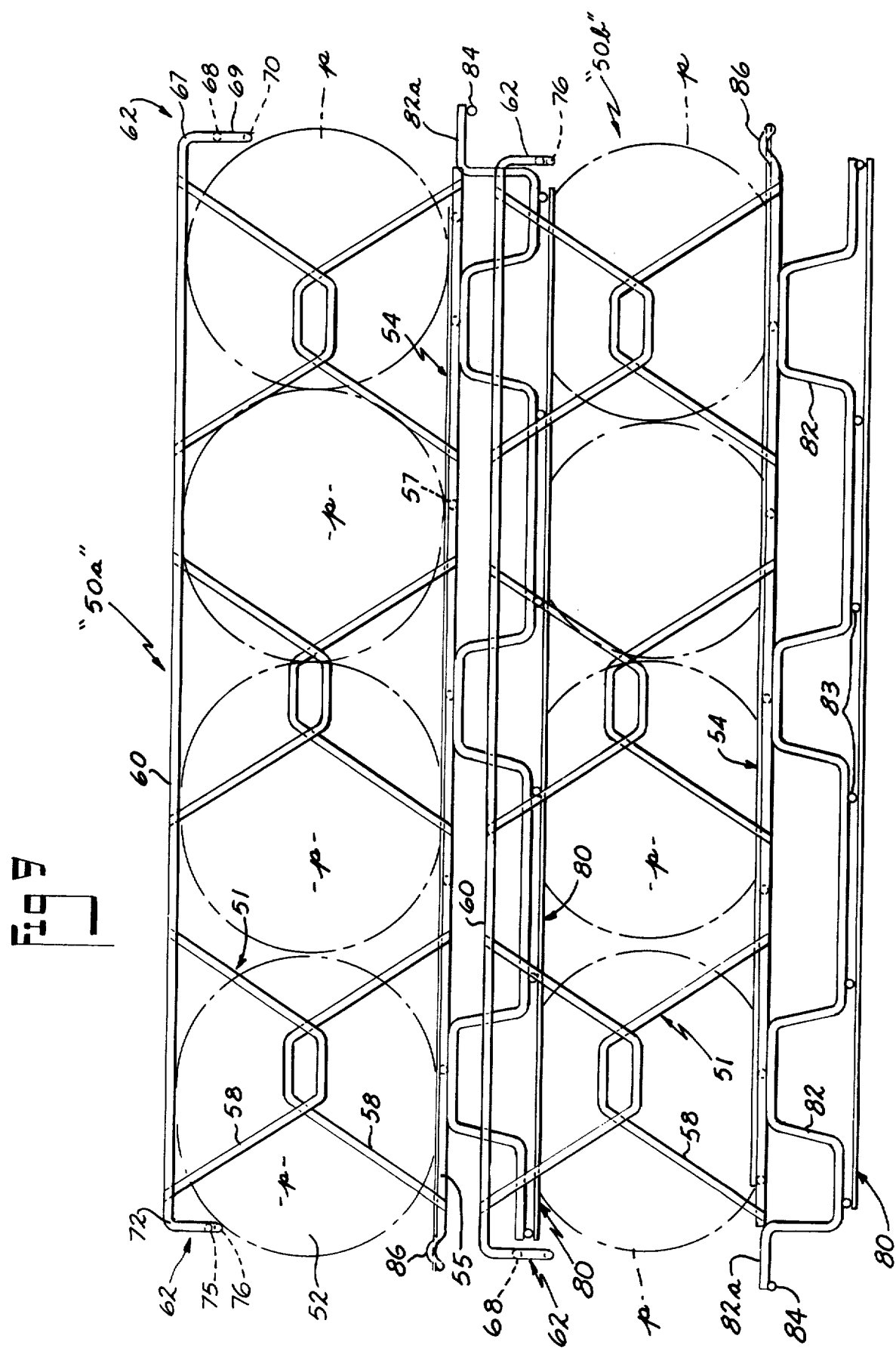

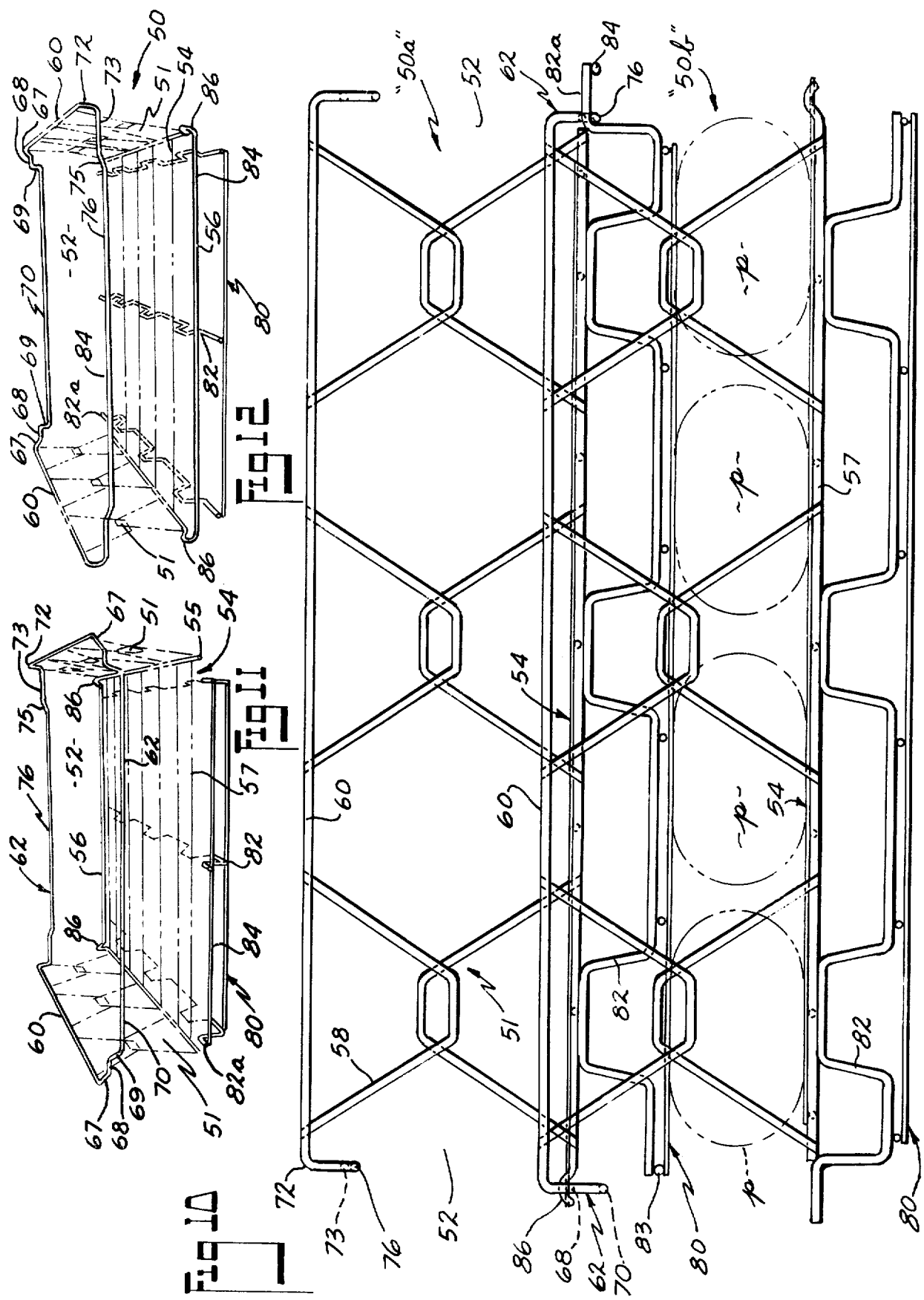

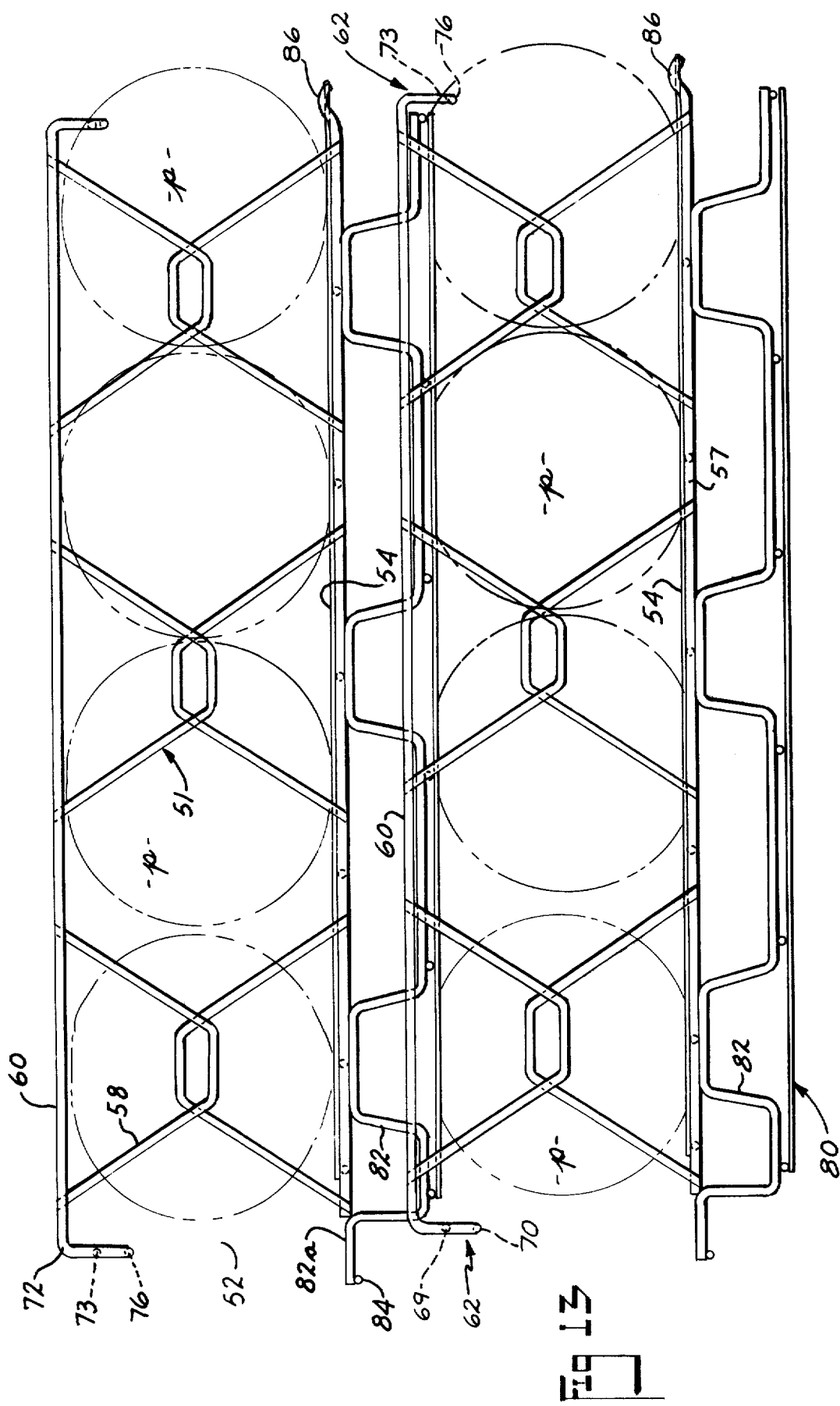

TIERABLE AND NESTABLE RECEPTACLE

DESCRIPTION

1. Field of Invention

This invention relates to a new and novel tierable and nestable receptacle, container or basket especially designed for use in smoke processing of meats, and the like.

2. Description of the Prior Art

Typical tierable receptacles or containers adapted for use in smoke processing of meats are disclosed in U.S. Pat. Nos. 1,916,220; 3,393,809; 3,473,465; 3,618,511; 4,029,004 and 3,155,030 and are basically of two configurations. One such assembly is illustrated in U.S. Pat. No. 1,916,220 wherein a plurality of tierable or stacked containers are utilized to hold meat products during smoke processing and wherein each container is supported by and on the meat product carried on the next container immediately therebelow. In this configuration or assembly, the smoked meat product produced is not of uniform thickness by reason that the weight pressing down on any one of the meat products corresponds to the position in the stacked assembly occupied by said product.

The second configuration of rack assembly is illustrated in U.S. Pat. No. 3,393,809 wherein each of the rack units is provided with a tray for supporting the meat product which is engaged by the rack unit disposed immediately thereabove as said unit moves downward in the smoking process to thereby limit the downward pressing action on the product carried in the rack therebelow.

The nestable and tierable container of the present invention is directed to an improvement in the latter type of container structure.

SUMMARY OF INVENTION

A preferred embodiment of receptacle of the present invention is directed to an improvement in tierable and nestable receptacles, containers or baskets for use in smoke processing of meat products and the like and wherein each container or basket has a unique construction whereby a desired thickness of smoked product may be produced. The receptacle or basket of the present invention is capable of being tiered or stacked with other like receptacles and is adapted to hold food products such as meat products intended to be smoked. When tiered or stacked, each receptacle is initially supported on the food product disposed in the next lower receptacle in the stack such that when the stack is placed into a smoke unit, the weight of the stack supported by the food product in the next lower receptacle acts as a press on said product and compresses the same as it shrinks in the cooking or smoking process. When the product has been compressed to a predetermined height, each receptacle in the stack has been lowered on its supporting food product to engage the next lower receptacle and rests thereon to thus stop the pressing action at said predetermined height of food product.

In a second configuration of receptacle dislosed herein its unique design enables two different anticipated thicknesses of smoked food product to be produced.

It is therefore an object of the present invention to provide a new and novel receptacle, container or basket designed for tiering or stacking when in use and nestable when in storage and especially adaptable for use in the smoke processing of food products such as meat and the like, being operable to produce smoked products of predetermined thickness.

Another object of the receptacle of the present invention is to provide a tierable and nestable receptacle especially designed for the smoke processing of meat products and the like and wherein each receptacle, when tiered or stacked, is initially supported on the food product disposed in the next lower receptacle in the stack such that the supported receptacle stack acts as a press on said food product during the smoke process thus compressing the same to a predetermined height.

Another object of the present invention is to provide a tierable and nestable receptacle especially designed for the smoke processing of meat products and the like and wherein each receptacle is provided with support means operable to selectively provide smoked products of one of two different thicknesses.

Other objects of the receptacle of the present invention will become apparent to one skilled in the art to which it relates upon reference to the following disclosure of several preferred embodiments thereof, and which are illustrated in the drawings wherein:

BRIEF DESCRIPTION OF THE DRAWINGS

FIG. 1 is a perspective view showing a stack of tierable receptacles of the present invention in schematic form disposed on a wheeled dolly as one environment of use adapted to carry the stack into and out of a typical smoke processing or cooking unit;

FIG. 2 is a top plan view of a first embodiment of receptacle of the present invention;

FIG. 3 is an elevational side view of the receptacle of FIG. 2;

FIG. 4 is an end view of the receptacle of FIG. 2;

FIG. 5 is a perspective view of the receptacle of FIG. 2;

FIG. 6 is a partial sectional view of two of the receptacles of FIG. 5 in their tiered or stacked relation, in each of which is disposed a meat product or the like to be smoked with the upper receptacle being supported on the meat product disposed in the lower receptacle in the position generally occupied thereby prior to exposing said meat product to the smoke process;

FIG. 7 is a partial sectional view like FIG. 6, and illustrating schematically how the meat product begins to shrink once the smoke process has begun, whereby the upper receptacle supported on the then shrinking meat product carried in the next lower receptacle gradually moves toward said lower receptacle;

FIG. 8 is a partial sectional view like FIG. 7 and illustrates the position occupied by the upper receptacle with respect to the next lower receptacle after it has been lowered to and supported on said next lower receptacle at a later time in the meat smoking process at which time the meat product has shrunk to its minimum thickness such that it no longer supports said upper receptacle thereon but has transferred the support of said upper receptacle onto said next lower receptacle;

FIG. 9 is a side elevational view of two receptacles of a second configuration capable of providing for two different thickness of smoked meat product and illustrated in their stacked or tiered relation and showing the upper receptacle being supported by the meat product in the next lower receptacle and at an intermediate time period in the smoking process, the arrangement of the receptacles of this tier or stack providing for the greater thickness of smoked product;

FIG. 10 is a side elevational view of the two receptacles of FIG. 9 but at a time period later in the smoking process whereat the meat product has shrunk to its minimum thickness and the upper receptacle has become seated on the next lower receptacle;

FIG. 11 is an end view of the receptacle of FIG. 9;

FIG. 12 is an elevational view of the opposite end of the receptacle of FIG. 9;

FIG. 13 is a side elevational view of two receptacles of the second configuration illustrated in their tiered or stacked relation at an intermediate time period in the smoking process and showing the upper receptacle supported on the meat product in the lower receptacle, the upper receptacle being reversed in its position to provide for the lesser thickness of smoked meat product.

Figure 14:
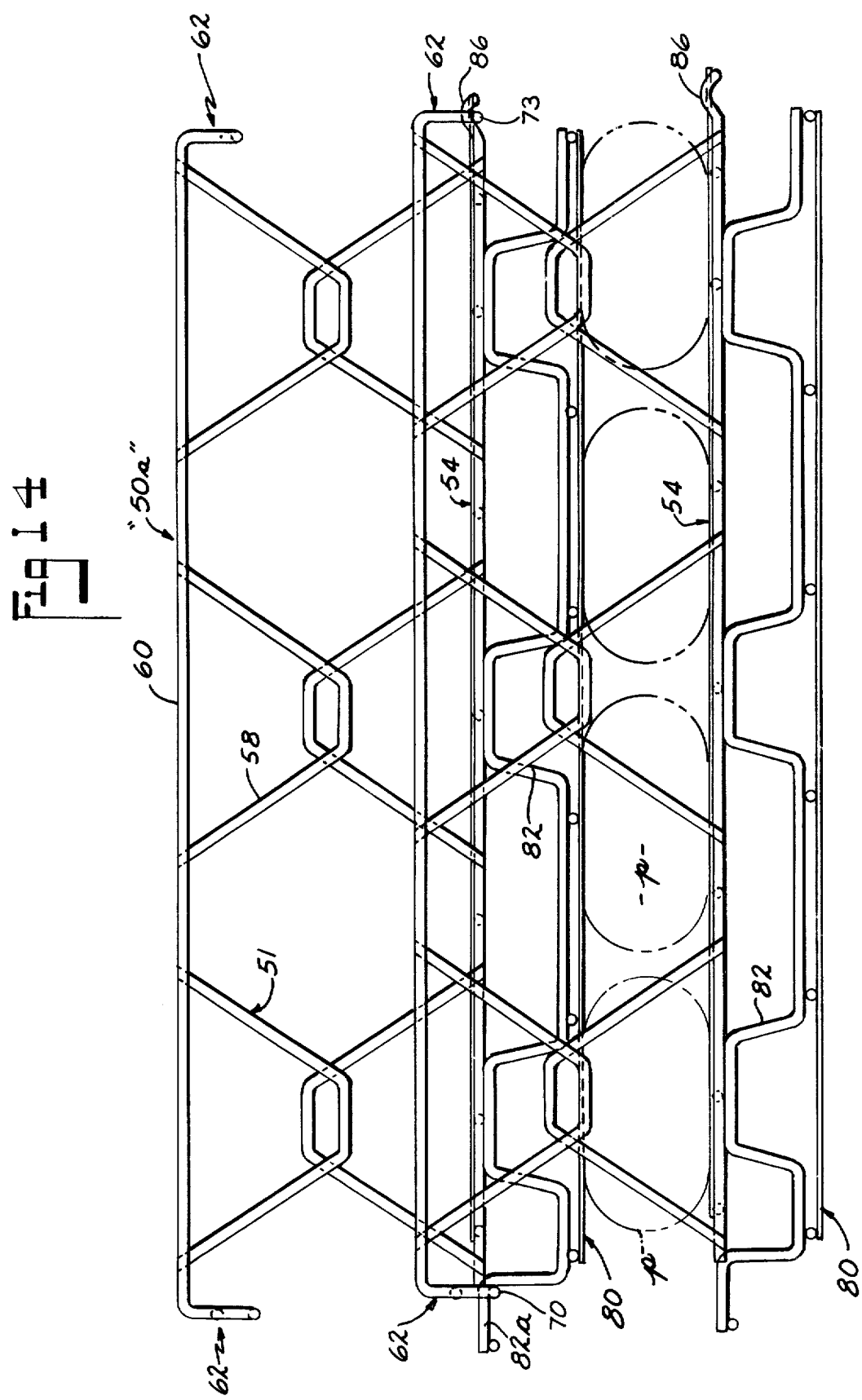
FIG. 14 is a side elevational view of the two receptacles of FIG. 13 but at a time period later in the smoking process whereat the meat product has shrunk to its minimum or lesser thickness and the upper receptacle has seated on the lower receptacle.

With reference directed to the embodiment of receptacle of FIGS. 1-8, and as best seen in FIG. 5, this receptacle 1 is constructed of metallic wire and is somewhat of parallelepiped configuration defining opposed side walls 2 extending upwardly and outwardly from a product supporting tray 3 which, in turn, is supported upon and in spaced relation above a rectangular shaped grid-like plate 4.

With this configuration, as will be hereinafter understood, the receptacles may be nested, as that term is defined in the art, for storage when not in use, and enables one receptacle to move partially into the next lower receptacle when the same are tiered when in use in the smoke processing of meat products.

The opposed end walls 5 of the receptacle are each open between the tray 3 and end rail 13.

Each side wall 2, as best seen in FIG. 7, is comprised of pairs of downwardly and upwardly extending brace members 7 somewhat pyramidal in contour, each of which in turn is formed of a pair of bars 8 integrally formed to a centrally disposed horizontally extending rail 9.

Each of the pairs of brace members 7 partially overlaps and thereat are preferably attached to each other by spot welding or the like. In the embodiment illustrated, each side wall 2 comprises three pairs of said brace members 7. As best seen in FIGS. 5 and 7, the downwardly projecting brace members 7 on each side of the receptacle 1 are suitably attached by welding or the like to an upper rail member 12 which extends along each side of the receptacle to define the top of the side wall 2. An end rail 13 is disposed on each end of the receptacle, and in the present embodiment is integrally formed with the side rail members 12 to thus form a one-piece top rail for said receptacle, the ends thereof being suitably fastened together to form substantially a rectangular rail member.

As seen in FIGS. 4 and 5, each end of each rail member 13, immediately adjacent each side rail member 12, is fabricated to define a portion 14 that extends angularly from the adjacent side rail member 12 and downwardly toward the product supporting tray 3 to connect with an intermediate support portion 15 that is spaced below and which extends coplanar with the side rail. Said intermediate support portion 15 integrally connects at its inner end to a second angularly projecting portion 16, which in turn connects to the centrally disposed bar 17, the latter extending laterally across the open end 3 of the receptacle.

As best seen in FIG. 5 the product supporting tray 3 is rectangular and grid-like in its assembly, having a frame composed of side rod members 25 connected at opposite ends to transversely extending end rod members 22. In the embodiment illustrated the side and end rod members 25 and 22 may be formed from a single piece of wire which is fabricated into the desired rectangular shape and welded at its ends to form a one-piece frame. Rod members 26 are disposed in parallel spaced relation and extend longitudinally of the side rod members 25 and are suitably attached at their ends to the end rod members 22. Cross brace members 27, disposed in spaced relation to each other extend transversely across and under the rod members 26 and connect at their ends to the side rod members 25.

As best seen in FIGS. 3 and 5, a downwardly opening loop 28 is formed on each end of each side rod member 25, and as best seen in FIGS. 3 and 6, the loops 28 extend over and outwardly in longitudinal extension of said members 25 beyond the end rods 4a of the plate 4, and are thus disposed when several or more receptacles are tiered as illustrated in FIG. 1, so as to seat upon the support portions 15 of the end rail members 13 of the next lower receptacle to thus define the fully compressed position of the tiered receptacles, and as will be more fully explained, to thereby define the final thickness of the smoked product as depicted in FIGS. 6 and 8 at "p."

As best seen in FIGS. 2 and 4, the length of the transversely extending end members 22 of the tray 3 is less than the transverse length of the end rails 13 to thus position the loops 28 on the side rod members 25 directly over the support portion 15 of the next lower receptacle when several or more receptacles are disposed in tiered relation.

Plate 4 of each receptacle is disposed below the supporting tray 3 and retained in said position by brackets 30 which interconnect with the underside of the tray 3 and the cross braces 4A of the plate 4.

Referring to FIGS. 6-8, several of the receptacles 1 are partially illustrated in a typical tiered relation, preparatory to using the same in a meat smoking process and wherein the lowermost receptacle is identified in the tier as "1a," and the next receptacle thereabove identified as "1b."

FIG. 6 illustrates the tiered receptacles in their respective positions upon their initial loading peparatory to being placed into the smokehouse. As seen therein, a number of the products "p" (only one of which is seen) are placed upon the tray 3 of the lowermost receptacle "1a" which is intended to be supported within wheeled dolly d of FIG. 1.

The next receptacle "1b" is then placed over the lowermost receptacle "1a," such that the plate 4 rests upon the products "p." In this initial position, FIG. 6, the loops 28 of the side rod members 25 of the tray 3 of the upper receptacle 1b is spaced above the support portions 15 of the end rail members 13. A typical spacing is about one inch.

Succeeding receptacles similarly loaded may be tiered within the wheeled dolly d of FIG. 1 which may then be moved into the smokehouse for smoke processing the products p.

As the smoking process is begun and continued, and with each of the products p being pressed by the load supported thereon, said product gradually shrinks, one such intermediate stage being illustrated in FIG. 7, until the loops 28 on the side rod members 25 on each "supported receptacle" seat upon the support portion 15 of the end rail members 13, as is shown in FIG. 8, whereby the load is thence immediately transferred from the supporting product p therebelow to the next lower receptacle, to thus define the final thickness for the product p.

In this manner, the final smoked products p each have the approximately same thickness. In the illustrated embodiment of FIGS. 1–8, a typical final thickness of product p is approximately 4 inches.

It will be noted, upon review of FIGS. 7 and 8, that as the product p begins to shrink, the plate 4 and lower portion of the upper receptacle 1b partially nests within the upper portion of the lower receptacle 1a until, as aforesaid, the loops 28 seat upon the support portions 15 of the end rail members 13.

When not in use the receptacles may be nested or stacked one within the other for convenient storage.

Referring to FIGS. 9–14, a second embodiment of receptacle is illustrated capable of selectively providing for either of two different thicknesses of smoked product.

As best seen in FIGS. 11 and 12, the receptacle as identified in its entirety at 50 is substantially the same general configuration as the previous embodiment, i.e. parallelepiped having upwardly and angularly outwardly extending side walls 51 and open ends as defined at 52.

The product supporting tray 54 comprises a three-sided frame having opposed side rail members 55 and a single end rod member 56. A plurality of rod members 57 extend between the side rail members 55 and are suitably fastened thereto.

Suitable brace members 58, similar to the brace members 7 of the previous embodiment, interconnect in the same manner between the side rod members 55 of the tray 54 and the side rail members 60 of the top frame-like structure of the receptacle. As seen in FIGS. 11 and 12, in which Figures the receptacle has been rotated 180° about its horizontal plane, the top frame-like structure is formed of one-piece metallic rod material having the aforementioned side rail members 60 integrally connected with end rail members 62.

One of the end rail members 62 is formed having a downwardly angularly extending part 67 at each end closely adjacent each of the side rail members 60, and which connects with an intermediate part 68, the latter being substantially coplanar with the plane of the supporting tray 54 and which, in turn, connects with a second downwardly angularly extending part 69. Said latter part 69 connects to a medial rail portion 70.

The remaining end rail member 62 is formed on each end with a vertically downwardly projecting part 72 integrally connecting at one end to an intermediate rod part 73, which also extends coplanar to the plane of the tray 54, the opposite end of which part 73 integrally connects to a downwardly angularly extending portion 75, said portion 75, in turn, integrally connecting with a center rail member 76.

The relative positions occupied by the various parts of the above described end rail members 62 with respect to the side rail members 60 may be seen in FIG. 10. As for example, the intermediate planar rail part 68 of said end rail members 62 is disposed at a level that is closer to and below the level of its side rail members 60 than all other end rail portions whereas rail portion 73 is disposed at the next lower level. In similar manner the rail portion 76 is disposed at the next lower level and rail portion 70 is disposed at the lowest level with respect to the side rail members 60. The purpose for this particular disposition of the aforesaid parts of said end rail members 62 will be described in greater detail hereinafter.

The receptacle 50 is also seen to be provided with a grid-like plate 80 and which, as best seen in FIGS. 11 and 12, is narrower in transverse dimension than the overall width of the receptacle being thus disposed inside of the side rail members 55 of the product supporting tray 54. Plate 80 is suspended below the product supporting tray 54 by a series of three upstanding channel members 82 which, as seen in FIG. 10, interconnect between the top of the transverse rail members 83 of the plate 80 and the underside of the rod members 57 of the tray 54. One end 82a of the channel members 82 projects outwardly of the end of the product supporting tray 54 slightly below the plane of the side rail members 55 and in longitudinal extension relative thereto. A rod member 84, as best seen in FIGS. 11 and 12, is suitably attached to the underside of each end 82a of said channel members 82 so as to extend across the width of the grid-like plate 80. As will be more clearly understood, the width of the plate 80 is equal to or slightly less than the length of the center rail portion 76 of the one end rail 62.

As also best seen in FIGS. 10 and 12, a downwardly opening loop 86 is formed in each side rail member 55 of the tray 54 at the end thereof closely adjacent the end rail member 56.

As previously mentioned, the present embodiment of receptacle is capable of providing for two different thicknesses of smoked product p, as for example thicknesses of approximately 3 inches and 3½ inches.

To accomplish this alternative product thickness, the receptacles are tiered in a particular manner.

Referring to FIGS. 9 and 10, the tiering arrangement illustrated therein provides for a product thickness of approximately 3½ inches, whereas the tiering arrangement illustrated in FIGS. 13 and 14 provides for a product thickness of approximately 3 inches.

With respect to the arrangement of FIGS. 9 and 10, two receptacles are shown, the upper receptacle being identified as 50a and the lower receptacle identified as 50b.

The lower receptacle 50b, although not shown, may be placed into the wheeled dolly d of FIG. 1 in the position therein depicted as "1a," and the next succeeding receptacles 50a, 50c, 50d, ... etc. stacked or tiered in the manner now to be described.

As seen in FIG. 9, the meat products P are placed onto the tray 54 of the lower receptacle 50b; and the next receptacle is then placed over said lower receptacle so that its grid-like plate 80 rests upon said meat products p.

It is also seen that the upper receptacle 50a has been rotated 180° horizontally with respect to the lower receptacle 50b so that the open loops 86 on the side rail members 55 of the tray 54 are disposed over and spaced above the support portions 68 on the left end rail 62 of the lower receptacle as illustrated in FIG. 9.

In like manner, looking at the right side of the assembly as illustrated in FIG. 9, the end channel extensions 82a are thus spaced above the center rail portion 76 of the right end rail 62.

As aforementioned, the width of the grid-like plate 80 is equal to or slightly less than the length of the center rail portion 76, the purpose for which will now be explained.

Additional receptacles may be similarly loaded with meat products p and tiered or stacked with every other receptacle being rotated 180° with respect to the next lower receptacle.

The loaded dolly d may then be deposited into the smokehouse or the like whereat the smoke process begins.

As the smoke process continues, the meat product p begins to shrink and is hence pressed by reason of the weight of its supported load whereupon the receptacle 50a moves toward and becomes partially nested within the lower receptacle 50b until the loops 86 seat upon the support portions 68 on the left end rail 62 as seen in FIG. 10 and the end channel extensions 82 seat upon the center rail portion 76 of the right end rail 62.

This position as illustrated in FIG. 10 thus defines the final thickness for the meat product p.

Each of the remaining receptacles in the stack or tier move similarly downward into partial nested relation to its next lower supporting receptacle until the above described final position is reached whereat the meat product p carried therein is pressed approximately the same thickness, i.e. 3½ inches.

In the arrangement of tiered receptacles illustrated in FIGS. 13 and 14 for producing smoke meat product p of approximately 3 inches in thickness, it will be noted that the upper receptacle 50a is stacked or tiered with the lower receptacle 50b so that the loops 86 on the side rails 55 of the tray 54 of said receptacles are located on the same side of the stack or tier, i.e. the right side as viewed in FIG. 13 directed above in spaced relation to the medial rail portions 73 of the one end rail 62 on the next lower receptacle.

This arrangement thus locates the end channel extensions 82a of the grid-like plate 80 on the left side of the stack or tier directly above and in spaced relation to the center rail portion 70 of the other end rail 62 on said next lower receptacle.

With this tiered arrangement, as the meat product p shrinks in the smoking process, the upper receptacle 50a moves down toward the lower receptacle until the loops 86 seat upon the rail portions 73 of the one end rail member 62 and the end rail extensions 82a seat upon the center rail portions 70 of the other rail member 62.

This seated position is illustrated in FIG. 14 and defines the final thickness for the meat product p which, as aforesaid, is approximately 3 inches.

And, as previously described, each of the remaining receptacles in the stack moves in like manner into its next lower supporting receptacle pressing the meat product p thereon to its final thickness, i.e approximately 3 inches.

Having thus described several embodiments of receptacle of the present invention it is now seen that there is herein disclosed a novel and new receptacle which may be tiered or stacked with other like receptacles and adapted to be nested when empty. Each receptacle in the tier or stack is intended to hold food products that are to be placed in a smoke house for cooking with the weight of each receptacle being supported by the product in the next lower receptacle in the stack and thus serving as a press to compress the product in said lower receptacle, until such time as the product shrinks through the cooking process to a predetermined height. When the product is reduced to this predetermined height, each receptacle seats upon and rests upon the next lower receptacle in the stack to prevent further transmission of the product load, and thus stops the pressing action at the predetermined height, and further that each receptacle is of unique design whereby it may be used to accommodate two alternate heights of smoked food product.

We claim:

1. A receptacle of a tier or stack of like receptacles for smoke processing of meat products and the like and wherein each receptacle in the tier comprises a body of generally parallelepiped configuration having connecting side walls and end walls and a rectangular-shaped product support tray connected to the bottom edge of each said side walls, plate means disposed below said tray, bracket means attaching said plate means in spaced relation to and below said tray, said plate means being of rectangular configuration and wherein its transverse dimension is less than the transverse dimension of the tray, the end walls of said body having bar means disposed at the upper edges thereof, at least one surface portion of said bar means defining support means lying in a plane that is vertically displaced from the plane of the remaining portion of said bar means, abutment means at the opposed ends of said tray and projecting outwardly beyond the adjacent ends of the underlying plate means, meat products or the like adapted to be disposed onto the tray of a selected receptacle of said tier and onto the tray of the next receptacle in said tier above said selected receptacle, the plate means of said next receptacle resting upon the meat products in said selected receptacle whereby as the meat products are smoked sufficiently to cause shrinkage of said products said next receptacle moves toward and into partially nested relation with said selected receptacle whereupon the abutment means on the tray of said next or supported receptacle seats upon the support means of said selected receptacle.

2. A receptacle as defined in claim 1 and wherein the abutment means comprises loop portions disposed on each end of the support tray.

3. A receptacle as defined in claim 1 and wherein the abutment means comprises a loop portion disposed on one end of the support tray and a projection extending outwardly from the opposite end of the support tray.

4. A receptacle as defined in claim 3 and wherein the next receptacle in the tier is adapted to be disposed and supported on the meat products in the lowermost receptacle with the loop portion abutment means thereof located above the loop portion abutment means of the lowermost receptacle, said tiering arrangement being operable to provide a finished smoke meat product of a first predetermined thickness.

5. A receptacle as defined in claim 3 and wherein the next receptacle in the tier is adapted to be disposed and supported on the meat products in the lowermost receptacle with the projection type abutment means located above the loop portion abutment means of the lowermost receptacle, said tiering arrangement being operable to provide a finished smoked meat product of a second predetermined thickness.

6. A receptacle of a tier or stack of like receptacles for smoke processing of meat products and the like and wherein each receptacle in the tier comprises a body of generally parallelepiped configuration having connecting side walls and end walls and a rectangular-shaped product support tray connected to the bottom edge of each said side walls, plate means disposed below said tray, bracket means attaching said plate means in spaced relation to and below said tray, said plate means being of rectangular configuration and wherein its transverse dimension is less than the transverse dimension of the tray, the end walls of said body having bar means disposed at the upper edges thereof, first and second surface portions of said bar means defining support means each surface portion lying in a plane that is vertically displaced from the other and from the plane of the remaining portion of said bar means, first abutment means formed on one end of said tray and projecting outwardly beyond the adjacent end of the underlying plate means, second abutment means extending outwardly from said bracket means in substantially coplanar relation to the support tray and projecting outwardly beyond the adjacent end of the underlying plate means, a selected receptacle of said tier being stacked with respect to the next receptacle in said tier in either a first position or a second position whereat, in said second position, the selected receptacle is rotated horizontally 180° from its said first position with respect to the second receptacle, meat products or the like adapted to be disposed onto the tray of said selected receptacle of said tier and onto the tray of the next receptacle in said tier above said selected receptacle, the plate means of said next receptacle rests upon the meat products in said selected receptacle whereby as the meat products are smoked sufficiently to cause shrinkage of said product said next receptacle moves toward and into partially nested relation with said selected receptacle and the first abutment means on the tray of said next or supported receptacle seats upon the first surface portion of the bar means on one end of said selected receptacle, and the second abutment means on the tray of said next receptacle seats upon the second surface portion of the bar means on the opposite end of said selected receptacle.

* * * * *